United States Patent [19]

Gfrerer

[11] Patent Number: 5,079,640
[45] Date of Patent: Jan. 7, 1992

[54] MOTION TRACKING DEVICE FOR A MOVING OBJECT SUCH AS A MECHANICAL MINER

[75] Inventor: Manfred Gfrerer, Erlangen, Fed. Rep. of Germany

[73] Assignee: Siemens Aktiengesellschaft, Berlin and Munich, Fed. Rep. of Germany

[21] Appl. No.: 315,721

[22] Filed: Feb. 24, 1989

[30] Foreign Application Priority Data

Feb. 26, 1988 [DE] Fed. Rep. of Germany ....... 3806224
Feb. 26, 1988 [DE] Fed. Rep. of Germany ... 8802569[U]

[51] Int. Cl.$^5$ ............................................. H04B 10/00
[52] U.S. Cl. ..................... 359/144; 359/152; 359/180
[58] Field of Search .............. 455/603, 607, 600, 40, 455/95, 100, 115, 617, 618, 606; 364/513; 250/370.01

[56] References Cited

U.S. PATENT DOCUMENTS

| | | | |
|---|---|---|---|
| 3,845,389 | 10/1974 | Phillips et al. ...................... | 455/100 |
| 3,947,832 | 3/1976 | Rösgen et al. ......................... | 455/40 |
| 4,236,255 | 11/1980 | Burgener et al. .................... | 455/603 |
| 4,638,445 | 1/1987 | Mattaboni ........................... | 364/513 |
| 4,680,811 | 7/1987 | Harper et al. ........................ | 455/617 |
| 4,727,600 | 2/1988 | Avakian ............................... | 455/607 |
| 4,921,468 | 5/1990 | Miwa .................................... | 455/617 |

Primary Examiner—Reinhard J. Eisenzopf
Assistant Examiner—Kinfe-Michael Negash
Attorney, Agent, or Firm—Kenyon & Kenyon

[57] ABSTRACT

A signal transmitting installation that is mounted on a moving object comprises a central surface and at least one outer surface. Transmitting elements are distributed over each surface with more being arranged on the outer surface so as to create a higher intensity signal and more evenly illuminate a plurality of receivers distributed along the direction of motion of the object. The transmitting elements can emit signals that contain different codes. The coded signals are evaluated using the receivers positioned along the path of the motion of the object. The aim is to detect at the least the location of the object from the different codes in signals that are received by determining which codes do not overlap. The moving object can be a mechanical miner.

26 Claims, 3 Drawing Sheets

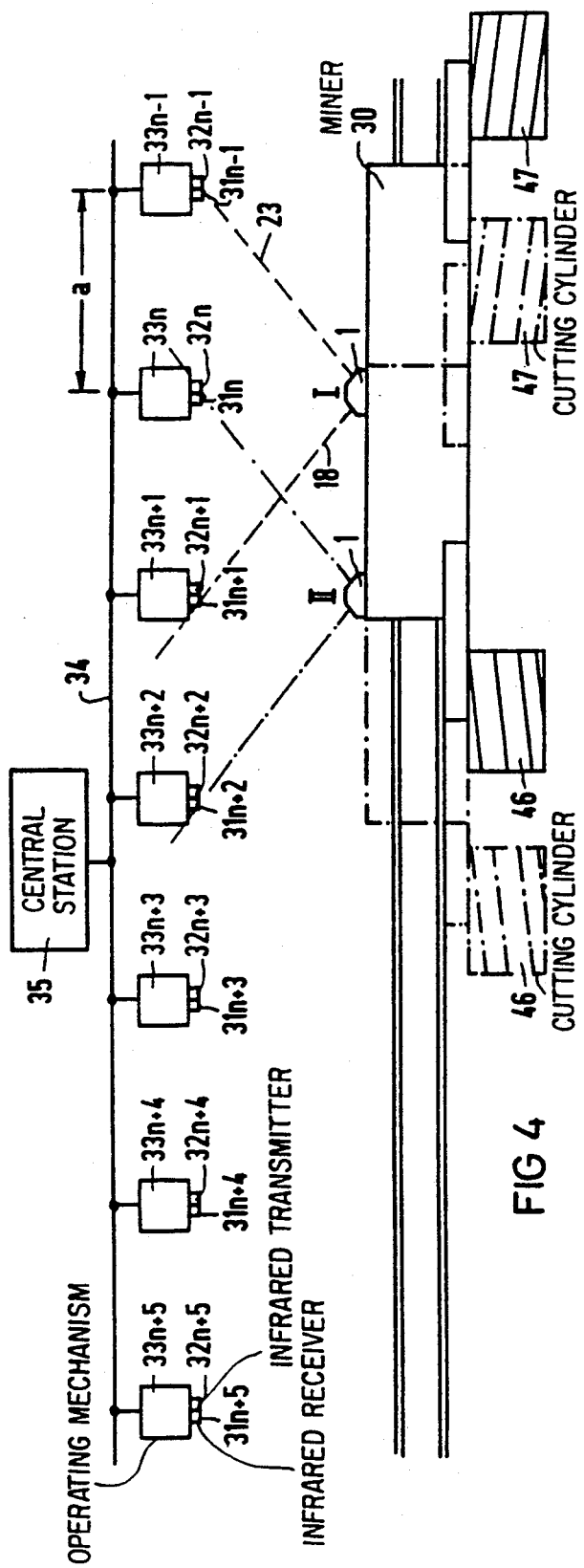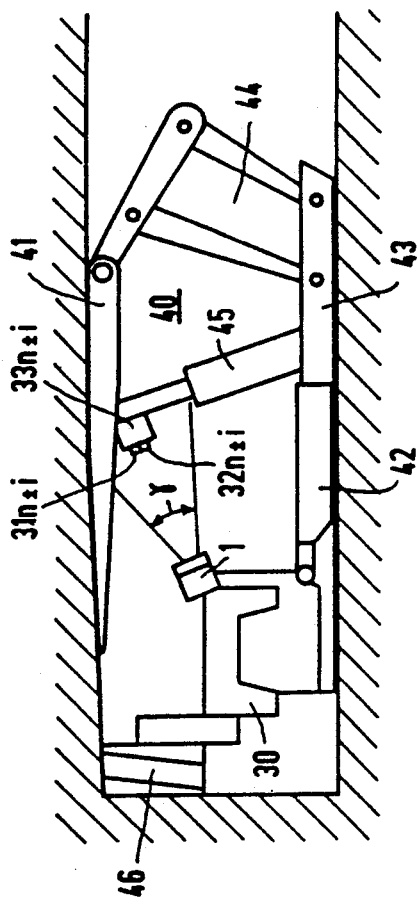

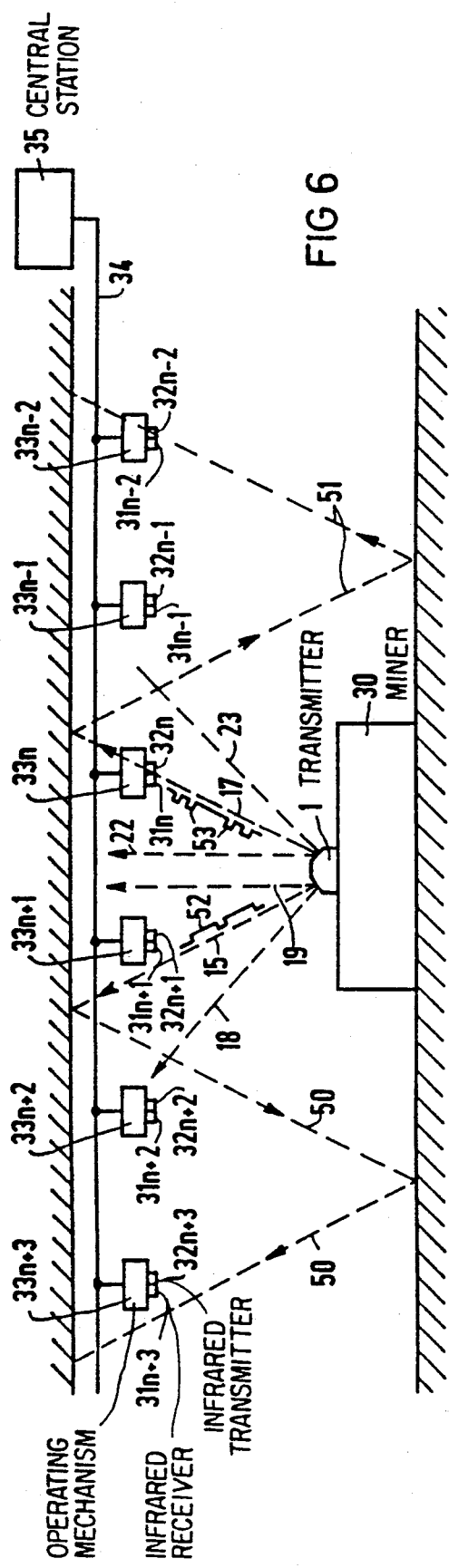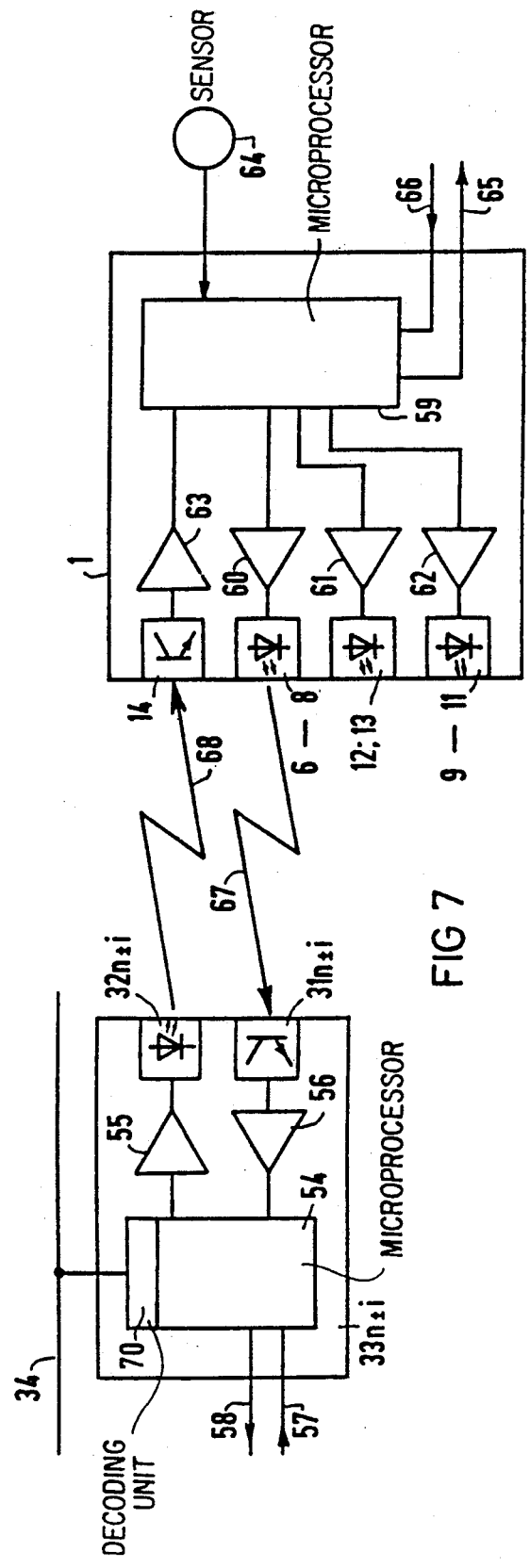

MOTION TRACKING DEVICE FOR A MOVING OBJECT SUCH AS A MECHANICAL MINER

BACKGROUND OF THE INVENTION

The present invention relates to a transmitter for an apparatus that tracks the motion of a moving object in which a signal transmitting installation emits signals that are picked up by receiving equipment which then evaluates the signals to determine at least the position of the object. The position determination can be made based on coded signals in which the codes that are received do not overlap.

An apparatus of this type can be used, for example, to track the motion of a mechanical miner that is used for underground mining in applications such as coal mining. An important prerequisite for automating the excavation work is to continuously find, with sufficient accuracy, the location of the mechanical miner, such as an auger or planer, in the stope (coal face). It is also desirable to determine the velocity of motion and direction of motion of the mechanical miner.

West German Patent Application No. 2,742,367 describes a device in which a specific location is determined by means of a position pulse transmitter and a pulse counter mounted on the gearing of the drawgear of a mechanical miner.

An object of published West German Patent Application No. 3,511,504 is to determine the location of the mechanical miner in the coal face with the help of a high-frequency transmitter that is mounted on the mechanical miner which releases switching contacts when it passes high frequency receivers at stope positions along the route.

A similar device that uses polarized electromagnetic radiation in the range of microwaves follows from the published West German Patent Application No. 3,337,742. Both the transmitter and receiver are mounted at a specific stope support. Rotating the plane of oscillation between transmitting and receiving positions using an appropriate wave guide that is mounted on the mechanical miner results in a position finding function that is not easily controlled because of sweep radiation.

Another device that determines the position of the cutting head of an advance working machine or a mechanical miner is known from European Patent Application 0,105,867. This patent application discloses a heat image camera that detects the infrared radiation emitted by the heated cutting head.

Position finding devices for mechanical miners that use infrared radiation are known from, for example, published West German Patent Application 30,44,108, corresponding to U.S. Pat. No. 4,330,154, which is assigned to Dowty Mining Equipment Ltd., and further from the brochure "Dowty Mining Electronic Control, Machine Initiation by the Infra-Red System" of the same corporation. The mechanical miner disclosed in the brochure contains an infrared transmitter. The Patent discloses an ultrasonic system but states that other types of transmitters could be used such as an infrared transmitter. The receivers assigned to a given transmitter are configured at the stope supports. The West German Patent Application states that the transmitting-/receiving equipment especially prevents the advancing mechanical miner from colliding with the stope supports. The distance between the stope supports and the mechanical miner is continuously measured. A locking device releases a stop signal if the mechanical miner approaches a stope support. This situation could occur if, for example, the stope support is unintentionally placed too far forward due to a control error.

Systems that use infrared radiation to position conveyor vehicles, such as coking machines, bridge cranes or traveling cranes, are also known from European Patent Application 0,150,289, corresponding to U.S. Pat. No. 4,557,805, as well as from the essay "Heavy-Duty Positioning Equipment" (Positionieranlage im rauhen Betrieb) by F. Bruns, special edition from "Electro-technik", Vogel publishing house, Wurzburg, issue 9/10, pages 1 to 4.

The foregoing position finding devices, however, have not yet been optimally designed, especially for tracking the motion of mechanical miners.

SUMMARY OF THE INVENTION

The present invention uses an apparatus of the type mentioned in the beginning of this application that assures optimum position finding. The present invention realizes that the effect of unwanted reflections can be kept to a minimum from the start if the headpiece for the transmitter of the signal transmitting installation is constructed appropriately. The transmission beam can have a generally oval shape in which the width and height are adjusted to keep signal reflections from the ground or the ceiling to a justifiable minimum. Reflections will still occur over the length of the coal face. Arranging a larger number of transmitting elements on outer sloping surfaces of the headpiece than, for example, in the middle surface can result in a stronger signal intensity along the edges of the beam than in the center of the beam. The differences in the intensity of the signals that are received is thus averaged out by the different paths traversed to adjacent receivers of the radiation receiving equipment. The accuracy of the position finding increases since the receivers that are used to directly determine the location of the object are always directly irradiated at approximately the same signal intensity.

The present invention further assumes that unwanted reflections scatter the signal that reaches the receiving equipment and will cause any code that is encoded in the signal to appear to overlap. It is further assumed that the degree of code overlap is more the further away the signal from the mechanical miner is received. The present invention assumes that any encoded signals that are received in which the code does not overlap provides a strong indication that the moving object, e.g. mechanical miner, is located directly across from the part of the signal receiving equipment that is detecting that signal. The present invention thus allows for determining the location of the object even if considerable signal scattering exists.

One embodiment of the present invention can determine the velocity of motion or the direction of motion of the object, e.g. a mechanical miner, by encoding the transmitted signal appropriately. This result can be attained by mounting a sensor on the object that can, for example, determine the direction of travel and speed of travel and that can supply a corresponding signal to encode the emitted radiation. The travel direction, or the speed, can therefore be established directly without having to make contact.

BRIEF DESCRIPTION OF THE DRAWINGS

FIG. 4 shows a schematic of the present invention arranged in a coal face;

FIG. 5 shows a lateral cross section of a mechanical miner that has signal receiving equipment on a signal transmitting end and a stope support equipped with a signal receiver/transmitter installation that interact in accordance with the present invention;

FIG. 6 shows the emission of encoded signals according to the present invention especially for the purpose of determining the location of mechanical miner in the coal face in the presence of signal reflections; and FIG. 7 shows a block diagram of a signal transmitter for a signal transmitting installation and a signal receiver for the signal receiving equipment.

DETAILED DESCRIPTION

Figure 1:
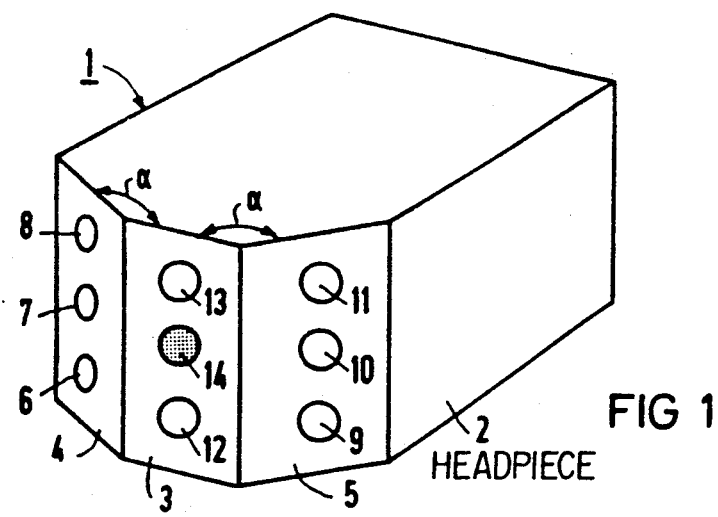
FIG. 1 shows a three dimensional perspective of a transmitter that forms an integral part of a signal transmitter of the present invention that is used to track the movement of an object, particularly a mechanical miner.

FIG. 1 shows a transmitter 1 of a signal transmitting installation that contains a headpiece 2. A transmitting end of the headpiece contains a central surface 3 and two side or outer surfaces 4, 5 that bend backwards at an obtuse angle $\alpha$.

Each of outer or side surfaces 4, 5 is equipped with a total of three transmitting elements 6, 7, 8, or 9, 10, 11, that are arranged in a vertical row. The central surface 3 contains only two transmitting elements 12, 13, between which a signal receiver 14 is also situated. Both the transmitting elements 12, 13 and the signal receiver 14 are arranged in a vertical row.

The embodiment shown in FIG. 1 uses infrared diodes as transmitting elements 6 to 13 and infrared detector as receiver 14. The signal that is transmitted is therefore infrared radiation. Infrared radiation is particularly well suited for mining applications because it can penetrate relatively thick dust clouds. Other types of signals, however, can be used. The transmitting elements may, for example, comprise ultrasonic transmitters or microwave transmitters. The signal receiver 14 is chosen according to the type of signal being transmitted.

Figure 2:
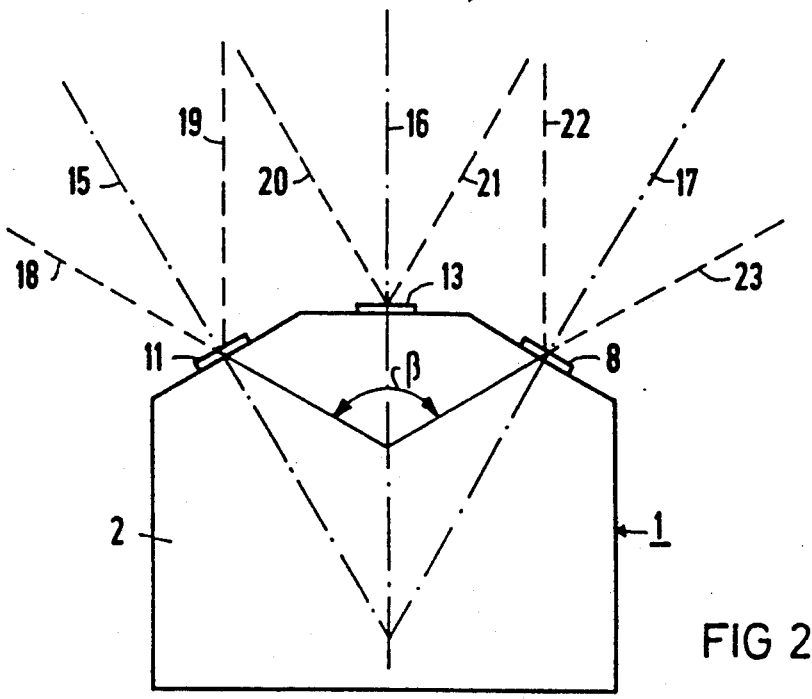
FIG. 2 shows a top view of the transmitter of FIG. 1 with the path of the signals indicated with a dotted line.

FIG. 2 is a top view that uses dotted lines to show the pattern of the signals. The shape of the main beam that is formed by the transmitting elements is shown by lines 15-17. The lateral extent of the infrared radiation generated by the transmitting elements on the different surfaces 3, 4, 5 are indicated by dashed lines 18-23. This embodiment can produce a transmission beam in the horizontal direction that has a horizontal aperture angle $\beta$ of, for example, 120 degrees.

Figure 3:
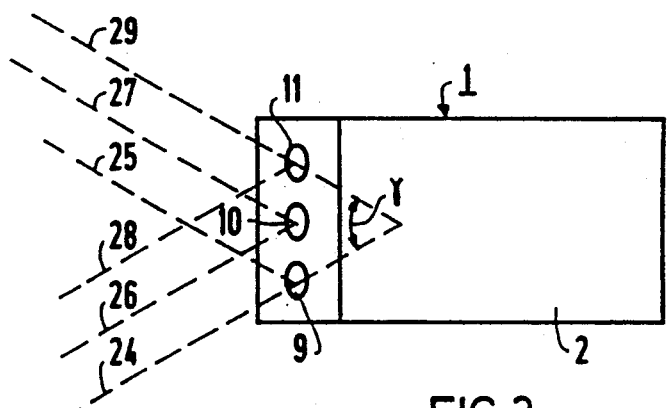
FIG. 3 shows a lateral cross section of the transmitter shown in FIG. 1 in which the path of the signals are shown in the same way as shown in FIG. 2.

The aperture angle $\alpha$ for the signal in the vertical direction is shown in FIG. 3. It lies in the range of, for example, 60 degrees. The vertical limits of the signal pattern formed by the individual transmitting elements are shown in FIG. 3 by dashed lines 24-29.

As discussed above, the outer or side surfaces 4 and 5 emit a higher intensity of infrared radiation than central surface 3 because transmitting elements 6-8 or 9-11 are greater in number than transmitting elements 12 and 13 on the central surface 3. Any differences in intensity between the traverse paths to the infrared receivers, shown in the FIGS. 4-6, thus average out. The transmitting beam has approximately an oval cross section. Severely limiting the transmitting beam avoids most infrared reflections in the coal face. If reflections nevertheless occur which hinder the function of location finding, the present invention contemplates switching to encoded signals as shown in FIG. 6. Alternately, the position location function can be performed entirely with encoded radiation from the outset.

FIGS. 4 and 5 show how the transmitter 1 can be mounted on, for example, an auger that is used on a mechanical miner 30 in a mining operation. The infrared radiation receivers $31n \pm i$ (with $i=0, 1, 2 \ldots$ etc.) are separated from each other along the stope route in the coal face at distances which can, for example, equal 1.5 m. In addition, an infrared transmitter $32n \pm i$ is assigned to each infrared radiation receiver $31n \pm i$. The infrared radiation receivers $31n \pm i$ and the assigned infrared transmitters $32n \pm i$ are thus components of individual operating mechanisms $33n \pm i$, at least one of which is always installed on the shield of a stope support as shown in FIG. 5. The individual operating mechanisms $33n \pm i$, in accordance with their task, control the movement of the stope supports and are connected to a central station 35 through a communication line 34 comprising, for example, a data bus.

FIG. 5 shows one embodiment of an individual operating mechanism in the shield of a stope support. The stope support 40 comprises a ceiling shield 41 and a ground skid 43 that has an advancing cylinder 42. The ceiling shield 41 and ground skid 43 are connected to each other by, for example, parts 44 that are pivoted at each end and by a hydraulic support 45. The auger 30 contains, for example, two cutting cylinders 46, 47 (cutting cylinder 47 is shown in FIG. 4). An individual operating mechanism $33n \pm i$ having an infrared radiation receiver $31n \pm i$ and an infrared transmitter $32n \pm i$ is positioned as described on, for example, the ceiling shield 41.

As described above, the position of the mechanical miner 30 follows from the position of the transmitter 1 relative to the infrared radiation receivers $31n \pm i$ that are irradiated. In FIG. 4, for example, the position I of the mechanical miner 30 is determined by the position of the infrared radiation receiver $31n-1$, $31n$ and $31n+i$ of the individual operating mechanisms $33n-1$, $33n$ and $33n+i$ as indicated by the dashed line. Position II of the mechanical miner 30 is determined from the position of the infrared radiation receivers $31n$, $31n+i$ and $31n+2$ of the individual operating mechanisms $33n$, $33n+1$ and $33n+2$ as indicated by the dot-dash line.

If the infrared reflections, such as reflections 50, 51 over the length of the coal face as shown in FIG. 6, impede the position finding function in the coal face, then the present invention switches to encoded radiation. This change is shown by example in FIG. 6 as signals 52 and 53. For example, the middle transmitting diodes 12, 13 of the transmitter 1 are turned off and the side infrared diodes 6-8 or 9-11 are alternately activated so as to generate different, complementary, pulse patterns. This example assumes that the pulse frequency is much less than the frequency of the infrared radiant energy that is being chopped or encoded.

The infrared radiation receiver $31n$ receives the encoded radiation 53 and the infrared radiation receiver $31n+1$ receives the encoded radiation 52 in the original code. The phrase "original code" means encoded signals that do not overlap. Infrared receivers $31n$ and $31n+1$ belong to the individual operating mechanisms $33n$ and $33n+1$ that lie closest to the transmitter 1 and are therefore also closest to the location of the mechanical miner 30. The infrared radiation receivers $31n-1$, $31n-2$, and $31n+2$, $31n+3$ of the individual operating mechanisms $33n-1$, $33n-2$, and $33n+2$, $33n+3$, respectively, are located further away and, in contrast, receive radiant energy signals with codes that overlap due to reflections. The individual operating mechanisms are capable of recognizing the original code and of distinguishing between signals in which the code patterns overlap and those that do not. In this example, the existence of a signal that has a code that has no overlap is established by the individual operating mechanism $33n+1$ and transmitted to the central station 35. The current location of the mechanical miner 30 can then be determined in the central station 35 from the location of the individual operating mechanisms $33n$ and $33n+1$ using the infrared radiation receivers $31n$ and $31n+1$.

The infrared transmitter $32n\pm1$ of individual operating mechanism $33n\pm i$ can transmit data in the opposite direction, namely from an individual operating mechanism to the infrared radiation receiver 14 of the transmitter 1. In this way the central station 35 can communicate with the mechanical miner 30 during, for example, pauses in the location finding process then occurring. For example, a so-called "emergency-off" signal can be sent directly to the mechanical miner 30 to cause it to stop immediately in a dangerous situation.

The possible infrared communication between an individual operating mechanism $33n+i$ on a stope support 40 and the mechanical miner 30 is shown in the block diagram of FIG. 7. For example, each individual operating mechanism $33n\pm i$ can comprise a microprocessor 54 that is connected to central station 35 through a communication line 34. Microprocessor 54 can simultaneously regulate the infrared transmitter $32n\pm i$, an infrared transmission diode, through a driver stage 55. Furthermore, the microprocessor 54 can receive the signals that are collected by the infrared radiation receiver $31n\pm i$ through an amplifier 56 as the receiver receives the infrared radiation. Microprocessor 54 also communicates over lines 57, 58 with the periphery of the shield extension. The transmitter 1 on the mechanical miner 30 can accordingly further comprise a microprocessor 59, which, through the driver stages 60-62, can control the corresponding infrared transmission diode configurations 6-8, 9-11, or 12, 13. Microprocessor 59 can furthermore receive, through an amplifier 63, the infrared radiation of the respective transmission diode $32n\pm i$ on the individual operating mechanism $33n+i$ that was received by the infrared radiation receiver 14.

A sensor 64 can transmit the present speed of travel and the direction of motion of the mechanical miner in the coal face to the microprocessor 59 which can then communicate with the mechanical miner through signal lines 65 and 66. The microprocessor can also be located in the mechanical miner. The infrared radiation transmitted from the infrared transmission diode configurations 6-8, 9-11 or 12, 13 to the infrared radiation receiver $31n\pm i$ of an individual operating mechanism $33n\pm i$, is identified as signal 67 in FIG. 7. The infrared radiation transmitted from an infrared transmission diode $32n\pm i$ of the individual operating mechanism $33n\pm i$ to the infrared radiation receiver 14 in the transmitter 1 of the mechanical miner 33 is identified as code signal 68.

The present invention also allows the infrared radiation beam to be generated by quickly scanning an infrared laser beam.

The data transmitted from sensor 64 to microprocessor 59 concerning the direction of motion and the speed of travel of the mechanical miner 30 can also be transmitted in appropriate encoded form through the transmitting diodes 6-8, 9-11, or 12, 13 to the individual operating mechanisms $33n+i$ and, from there, to the central station 35. Therefore, information concerning the actual direction of travel and the speed of travel of the mechanical miner can be received in addition to the present location of the mechanical miner 30. The information transmitted from the transmitter 1 to the individual operating mechanism $33n\pm i$, especially the encoded signal 52, 53, is decoded and the code recognized and distinguished through a corresponding decoding unit 70 in microprocessor 54 or in the central station 35 to recognize the code pattern using known signal processing techniques.

The encoding and transmitting of the data, commands, etc., from the central station 35 through the individual operating mechanism $33n\pm i$ to the mechanical miner is preferably accomplished using a serial transmission format that can, for example, be in U-type protocol. The transmitter and the receiver have the same beam angle or sensitivity angle from the beginning. These angles extend horizontally over at least the distance between at least two individual operating mechanisms. Continuous local data transmission is thus assured while the mechanical miner is in motion.

What is claimed is:

1. A transceiver for tracking a mechanical miner, comprising:
    a headpiece having a transmitting side with at least two surfaces arranged at angles to each other, one of the surfaces being a central surface, the other surface being a first outer surface that is bent inwardly at an obtuse angle relative to the central surface, said headpiece also having an additional second outer surface that is bent inwardly at an obtuse angle relative to the first outer surface; and
    a transmitting emitter mounted on the transmitting side of the headpiece and having a plurality of transmitting elements arranged on the outer surfaces and the central surface, the outer surface having a number of transmitting elements that is greater than a number of transmitting elements on the central surface.

2. A transceiver as claimed in claim 1, wherein the transmitting elements emit signals that are encoded with at least one original code.

3. A transceiver as claimed in claim 2, wherein the transmitting elements emit a plurality of original codes.

4. A transceiver as claimed in claim 2, wherein the transmitting elements emit infrared radiation.

5. A transceiver as claimed in claim 3, wherein the transmitting elements emit infrared radiation.

6. A transceiver as claimed in claim 1, wherein the transmitting elements are arranged on the surfaces to produce a beam that has an aperture angle in the horizontal direction.

7. A transceiver as claimed in claim 6, wherein the aperture angle is 120.

8. A transceiver as claimed in claim 7, wherein the transmitting elements are arranged on the surfaces in a vertical row to form a vertical angular aperture in a vertical direction.

9. A transceiver as claimed in claim 8, wherein the vertical angular aperture is 60.

10. A transceiver as claimed in claim 9, further comprising a receiver that is positioned on one of the surfaces adjacent to the transmitting elements.

11. A transceiver as claimed in claim 10, wherein the signal receiver is positioned on the central surface.

12. A transceiver as claimed in claim 11, wherein three transmitting elements are arranged on both the first and second outer surfaces of the headpiece and two transmitting elements are arranged in a vertical row on the central surface.

13. A transceiver as claimed in claim 12, wherein the signal receiver is disposed substantially in the middle of the transmitting elements on the central surface.

14. A transceiver as claimed in claim 13, wherein the transmitting elements are infrared emitters.

15. A transceiver as claimed in claim 14, wherein the signal receiver is an infrared receiver.

16. A transceiver for tracking a mechanical miner, comprising:
- a headpiece having a transmitting side with at least two surfaces arranged at angles to each other;
- a transmitting emitter mounted on the transmitting side of the headpiece and having a plurality of transmitting elements arranged on the surfaces in a vertical row to produce a beam that has an aperture angle of 120°60 in the horizontal direction and to form a vertical angular aperture of 60° in a vertical direction; and
- a signal receiver positioned on the central surface adjacent to the transmitting elements.

17. A transceiver as claimed in claim 16, wherein three transmitting elements are arranged on both the first and second outer surfaces of the headpiece and two transmitting elements are arranged in a vertical row on the central surface.

18. A transceiver as claimed in claim 17, wherein the signal receiver is disposed substantially in the middle of the transmitting elements on the central surface.

19. A transceiver as claimed in claim 18, wherein the transmitting elements are infrared emitters.

20. A transceiver as claimed in claim 19, wherein the signal receiver is an infrared receiver.

21. A transmitter head comprising:
- a headpiece having at least two surfaces arranged at an obtuse angle to one another, one of the surfaces being a central surface and the other surfaces being an outer surface;
- a plurality of transmitting elements arranged on the central and outer surfaces of the headpiece, the outer surface having one or more transmitter elements and the central surface having one or more transmitter elements, the one or more transmitting elements on the outside surface emitting signals having a higher intensity than emitted by the one or more transmitting elements on the central surface, the transmitting elements emitting signals that are not encoded with a predetermined code pattern.

22. A transmitter as claimed in claim 21, further comprising at least a second outer surface having one or more transmitting elements arranged thereon to emit signals having a higher intensity than emitted by the one or more transmitting elements on the central surface.

23. A transmitter as claimed in claim 22, wherein the outside surfaces have a greater number of transmitting elements than the central surface.

24. A transmitter head comprising:
- a headpiece having at least two surfaces arranged at an obtuse angle to one another, one of the surfaces being a central surface and the other surfaces being an outer surface;
- a plurality of transmitting elements arranged on the central and outer surfaces of the headpiece, the outer surface having one or more transmitter elements and the central surface having one or more transmitter elements, the one or more transmitting elements on the outside surface emitting signals having a higher intensity than emitted by the one or more transmitting elements on the central surface, the transmitting elements emitting signals that are encoded with more than one predetermined code pattern.

25. A transmitter as claimed in claim 24, further comprising at least a second outer surface having one or more transmitting elements arranged thereon to emit signals having a higher intensity than emitted by the one or more transmitting elements on the central surface.

26. A transmitter as claimed in claim 25, wherein the outside surfaces have a greater number of transmitting elements than the central surface.

* * * * *